No. 670,142. Patented Mar. 19, 1901.
A. WEHNELT.
ELECTROLYTIC CURRENT INTERRUPTER.
(Application filed May 16, 1899.)
(No Model.) 2 Sheets—Sheet 1.
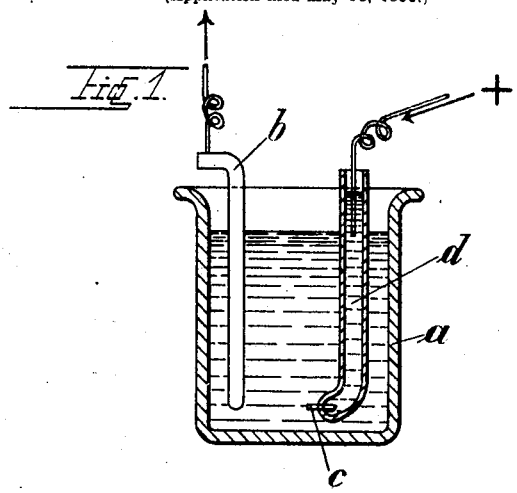
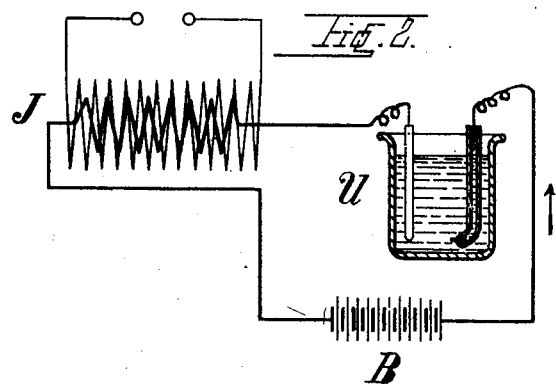
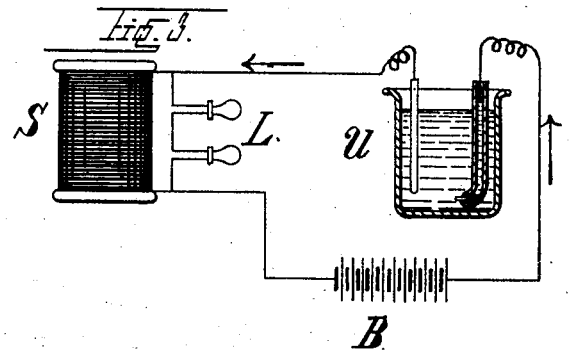

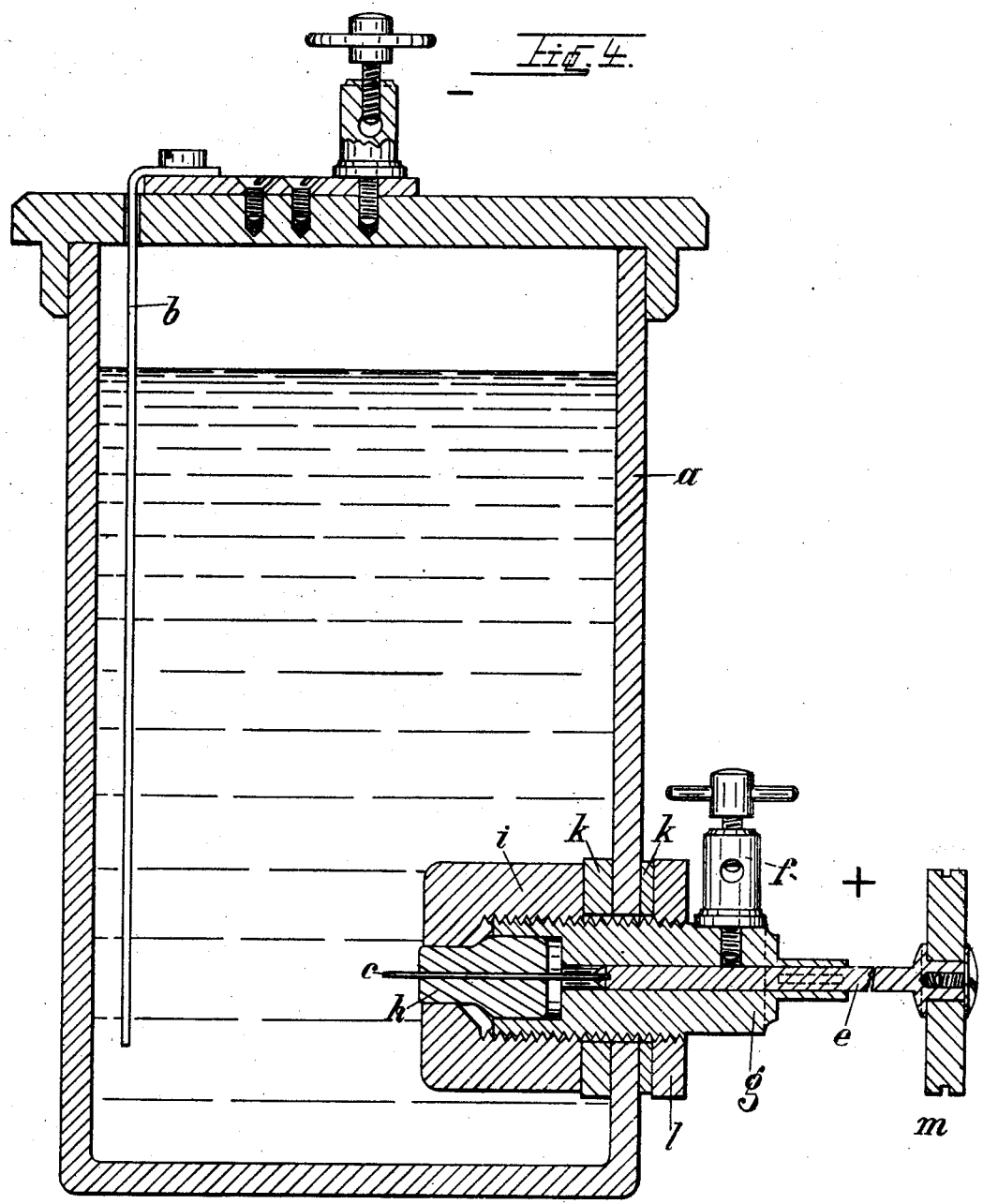

UNITED STATES PATENT OFFICE.

ARTHUR WEHNELT, OF CHARLOTTENBURG, GERMANY.

ELECTROLYTIC CURRENT-INTERRUPTER.

SPECIFICATION forming part of Letters Patent No. 670,142, dated March 19, 1901.

Application filed May 16, 1899. Serial No. 717,112. (No model.)

*To all whom it may concern:*

Be it known that I, ARTHUR WEHNELT, a subject of the Emperor of Germany, and a resident of Charlottenburg, Germany, have invented certain new and useful Improvements in Electrolytic Current-Interrupters, of which the following is a specification.

When an electric current is sent through an electrolyte by means of two electrodes of unequal surface area under a voltage largely surpassing the polarization tension in opposite direction, the well-known phenomena of light and heat occur. Lagrange and Hoho, *Lum. él*, 1894, Vol. 52, page 113, and Vol. 51, page 165, based recently an electric-welding process upon this occurrence. They called the smaller electrode manifesting the generation of light and heat the "active" electrode. The following publications treat of this subject: Franz Richarz, *Wied. Annals* 39, pages 67 and 201, 1890; C. Fromme, *Wied. Annals* 29, page 187, 1886; Koch and Wüllner, *Wied. Annals* 45, pages 473 and 759, 1892. The latter gentlemen mention that they heard under the above-stated conditions when a telephone was inserted a purring sound and they deduce therefrom and also from the noise manifesting itself simultaneously with the phenomena of light and heat that the current passing the apparatus is not constant, but oscillating. Closer study by me into this phenomenon has resulted in the discovery that the current is not only oscillating, but completely interrupted, reaching as high a speed as seventeen hundred breaks in a second.

For the experiments hereinafter described the apparatus represented in Fig. 1 was employed. Into a tumbler $a$, filled with diluted sulfuric acid, (preferably of 20° to 25° Baumé,) a lead plate $b$ and a platinum wire $c$ are dipped or submerged, the latter being fused into a glass tube $d$. The glass tube is filled with mercury for the purpose of conducting the current to the platinum wire $c$. It proves to be the most advantageous to pass the current through the apparatus in the direction shown in the figure.

The efficiency of the interrupter was hitherto tested, as stated below—

First, on inductors of a length of spark of two, fifteen, thirty, and fifty centimeters the connection is represented in Fig. 2. J designates an inductor; U, the electrolytical interrupter, Fig. 1 and B an accumulator-battery or other source of energy, (of at least fourteen volts.)

The discharge of the secondary coil of the induction-coil has a peculiar character always more arc-like under normal current owing to the high number and the regularity of the interruptions or breaks. The length of sparks is the same as the same induction-coil gives under equal current with the ordinary interrupters. By increasing the tension and the intensity of the current the effect of the induction-coils can be materially enhanced without being injurious for the new interrupter—as, for instance, for platinum interrupters, (in which the contacts will burn away.) Whatever enhances the self-induction in the circuit increases the efficiency of the apparatus. The intensity of the current grows with the increase in the surface of the active electrode. The number of the interruptions grows with the increase in tension or voltage.

In order to obtain easy change in the surface of the active electrode, the arrangement represented in Fig. 4 is appropriately made. The platinum wire $c$, forming the active electrode, is passed through a porcelain plug $h$ in this arrangement and fastened on a rod $e$ of brass or similar material. The latter is adjustable in the box $g$, made of brass or similar material, said box being provided at its inner extremity with a sleeve $i$, of hard rubber or the like, which sleeve is screwed on and passes over the porcelain plug $h$. At its exterior extremity the box is provided with a check-nut $l$. The packing of this box against the wall of this vessel $a$ takes place by means of the two rubber plates $k$, which are pressed together by the nut $l$. On the box $g$ is fixed the terminal $f$ for the positive pole. The rod $e$ is provided at its rear extremity with a disk $m$, by means of which the platinum wire $c$ can be pushed out from the porcelain plug $h$ as far as may be desired, so as to increase thereby the surface of the active electrode at will.

Second. When inserting incandescent lamps L parallel to the coil S, between $a$ and $b$, Fig. 3, which was fed in rotation by the electrolytic interrupter U, by means of the battery B, with twelve, twenty-four, forty-eight, and ninety-six volts, the following bright illuminations took place: When using twelve volts, a thirty-volt lamp; when using twenty-four volts, a 63.5-volt lamp; when using forty-eight volts, a one-hundred-and-two-volt lamp; when using ninety-six volts, two one-hundred-and-twenty-volt lamps. Electrometrical measuring of the terminal voltage showed that it always amounted to more than double the battery voltage.

Third. For converting direct current into alternating current for optional up-and-down conversion of the latter two converters were used, one hundred volts for primary and one thousand volts for secondary alternating current. These converters, fed by means of the new interrupter with a one-hundred-volt direct current, do not yield secondarily one thousand volts of alternating current, but two thousand volts and over of alternating current. When converted down again, the low voltage or tension coil of the second converter yielded two hundred volts. Many further tests with smaller converters proved the eminent usefulness and a good efficiency (up to seventy per cent.) of the interrupter for converting purposes.

I claim—

1. An electrolytical interrupter for direct currents comprising two electrodes, a vessel containing an electrolyte into which the electrodes dip, said electrodes being of a surface of unequal size, the anode serving as the active electrode and their terminal voltage being higher than the polarization tension, substantially as described.

2. In an electrical interrupter, the combination of the vessel containing an electrolyte, the two electrodes dipping therein, the active electrode being adjustable and means for adjusting the same consisting of the rod $e$ connected with the electrode, the insulating-block $h$ through which the electrode extends, the box $g$ through which the rod $e$ extends, means for holding the insulating-block to the box, means for holding the box to the vessel and means for electrical connection with the rod, substantially as described.

In witness whereof I have hereunto set my hand in presence of two witnesses.

ARTHUR WEHNELT.

Witnesses:
WOLDEMAR HAUPT,
WILLIAM MAYNER.